United States Patent [19]

Seki et al.

[11] 4,365,613

[45] Dec. 28, 1982

[54] HYDRAULIC-LIFT-BARBECUE COOKING APPARATUS

[76] Inventors: James Seki, 15328 Kenoak Dr., Baldwin Park, Calif. 91706; Damon J. Chung, 501 Marek Dr., Montebello, Calif. 90640

[21] Appl. No.: 894,523

[22] Filed: Apr. 10, 1978

[51] Int. Cl.³ .............................................. A47J 37/00
[52] U.S. Cl. ................................... 126/25 A; 126/154
[58] Field of Search ............... 126/25 A, 25 AA, 154, 126/41 E; 92/165, 165 PR; 91/457; 60/477

[56] References Cited

U.S. PATENT DOCUMENTS

| 552,006 | 12/1895 | Runkel | 92/165 R |
| 570,195 | 10/1896 | Ashcroft | 126/154 |
| 960,969 | 6/1910 | Leask | 126/154 |
| 1,343,117 | 6/1920 | Dana | 60/477 |
| 2,462,815 | 2/1949 | Sedgwick | 91/457 |
| 2,472,164 | 6/1949 | Mannheimer | 126/25 A |
| 2,624,329 | 1/1953 | Ernst | 126/25 A |
| 2,968,301 | 1/1961 | Cowart | 126/25 A |

FOREIGN PATENT DOCUMENTS 165244  1/1934  Switzerland ..................... 92/165 R Primary Examiner—James C. Yeung
Assistant Examiner—G. Anderson
Attorney, Agent, or Firm—Francis X. LoJacono

[57] ABSTRACT

A hydraulically operated barbecue cooking apparatus comprising a superstructure defining a housing having a firebox well arranged to receive a vertically adjustable firebox which is generally supported by a water-operated hydraulic lift, the lift being disposed in a cavity formed below ground level whereby the firebox can be adjusted upwardly or downwardly within the full length of the housing firebox well. The hydraulic lift has a stabilizing guide member attached between the firebox and the lift, the lift being operated by a control valve which directs water pressure into the cylinder housing to lift the piston, and allowing the water to drain when the piston is lowered together with the firebox.

1 Claim, 2 Drawing Figures

U.S. Patent  Dec. 28, 1982  4,365,613

HYDRAULIC-LIFT-BARBECUE COOKING APPARATUS

BACKGROUND OF THE INVENTION

1. Field of the Invention

This invention relates generally to barbecue units and like cooking devices, and more particularly to a barbecue unit having a firebox adjustable in its vertical relationship to the grill support by means of a hydraulic-lift device.

2. Description of the Prior Art

As is well known in the art, various problems and difficulties are encountered in providing suitable means for adjusting the fire or heat source of a barbecue unit with respect to its grill member so that optimum cooking conditions can be simply attained.

Various types of cooking units are used and these consist of both stationary and portable structures. However, the common cooking unit is designed so that the grill of the device moves relative to the firebox; and, thus, the movement of the grill is very limited. Hence, a meal can very easily be burnt and therefore rendered inedible.

In addition, most barbecue units do not have the capability of also being used as smokers.

SUMMARY OF THE INVENTION

The present invention comprises a superstructure, generally of the type wherein the unit is located outdoors in a stationary manner. Such a barbecue unit as herein described is constructed of brick and mortar, and has a firebox well which extends from the top surface to ground level. Directly in line with and below the firebox well there is formed a ground cavity to receive a hydraulic-lift device which is connected to a water flow system, such as can be found in and around a yard of a home where barbecue units are generally located.

The hydraulic-lift includes a piston member arranged to support a firebox in such a manner that the firebox can be readily adjusted upwardly or downwardly with respect to the grill member which supports the food being cooked.

Thus, by use of a valve device in the water-supply piping to the lift, the firebox can be raised or lowered along the full vertical length of the firebox well defined by the superstructure. Included between the firebox and the lift unit is a stabilizing guide apparatus which permits the firebox to be horizontally stabilized during movement thereof.

OBJECTS AND ADVANTAGES OF THE INVENTION

The present invention has for an important object a provision wherein the firebox of an outdoor cooking unit moves relative to the cooking grill, and is vertically adjustable by a hydraulic-lift device.

It is another object of the invention to provide a barbecue cooking unit that includes a hydraulically operated firebox wherein the hydraulic pressure therein is supplied by the conventional water systems used in homes and yards.

It is still another object of the invention to provide an apparatus of this type wherein the hydraulic cylinder is located in a cavity below ground level, thereby allowing greater adjustable travel within the firebox well and adjustable positioning of the firebox relative to the cooking grill member.

It is a further object of the present invention to provide an apparatus of this character that is relatively inexpensive to manufacture.

It is still a further object of the invention to provide an apparatus of this character that is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
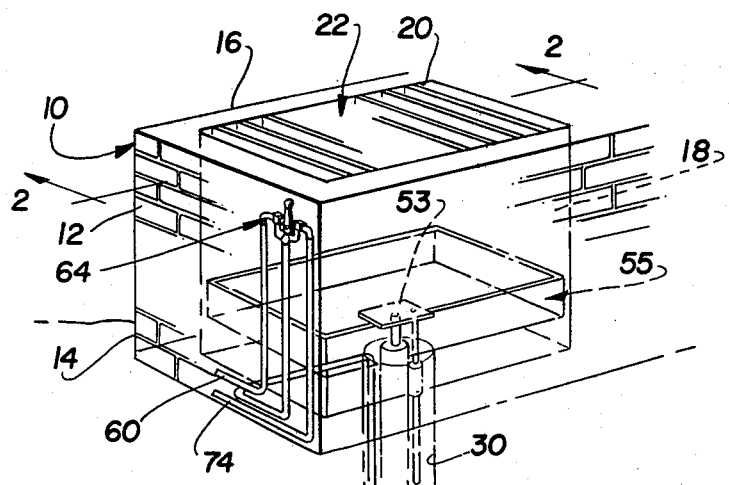
FIG. 1 is a pictorial, perspective view of the present invention in combination with a stationary superstructure defining the housing thereof.

Referring to the accompanying drawings, there is shown a superstructure, which defines a barbecue cooking unit, generally indicated at 10. The unit 10 can be constructed of many suitable materials, but is herein shown as being constructed of layers of brick 12 and mortar 14, thus forming a substantially stationary structure 16.

Structure 16 is so arranged as to provide a deep firebox well 18, wherein the upper, open end 20 thereof is adapted to receive and support a cooking grill top, indicated at 22, having a peripheral frame member 24 of the same configuration of opening 20. The grill can be of any suitable type or construction, and is shown having a plurality of grill bars 26.

Thus, it can be seen that the present arrangement establishes a fixed grill member, rather than the conventional movable food supporting grill.

Figure 2:
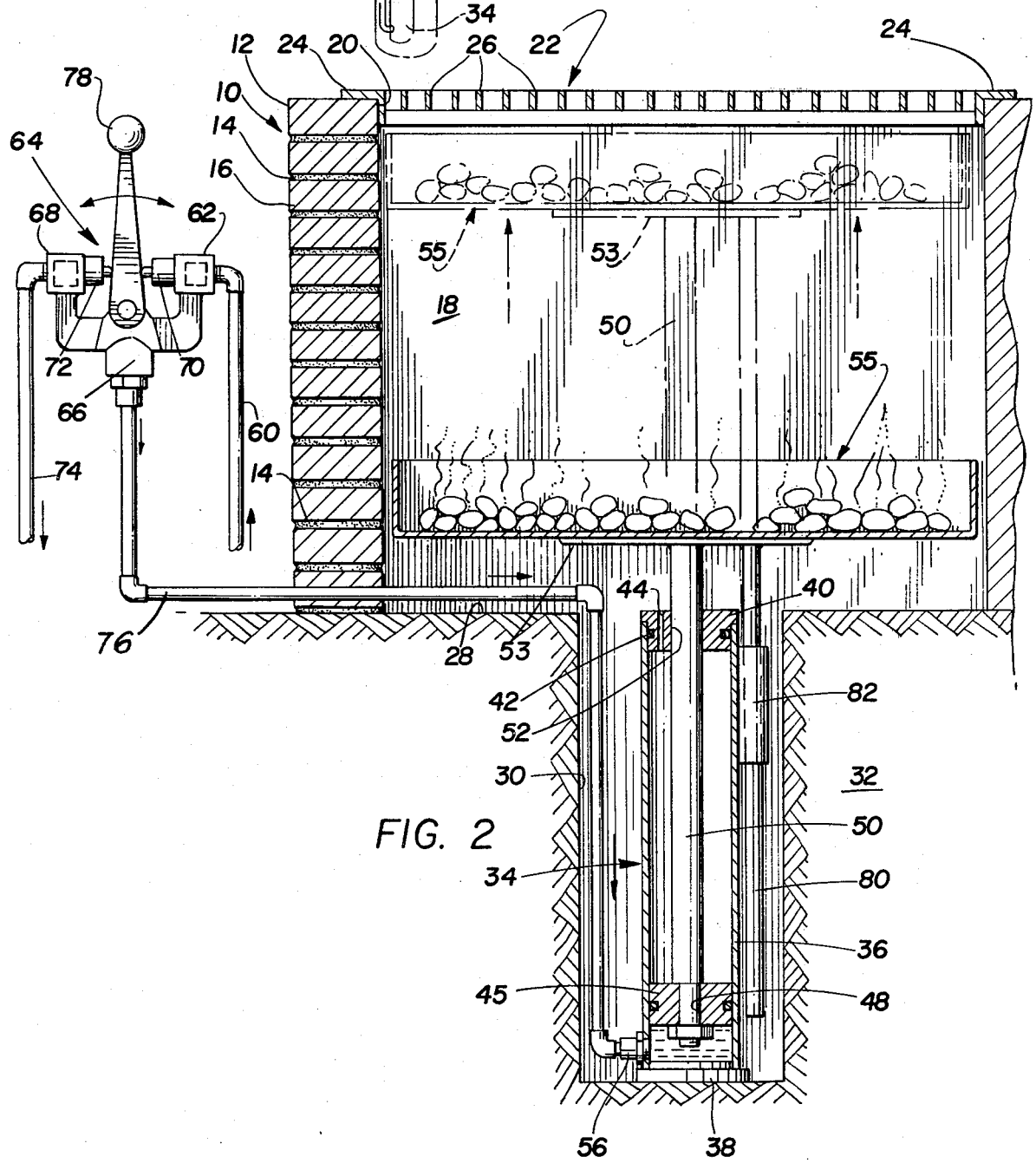
FIG. 2 is an enlarged, cross-sectional view taken substantially above line 2—2 of FIG. 1 which clearly illustrates the hydraulic device located in a cavity below ground level.

Superstructure 16, in this particular application, is shown constructed and supported on a ground surface 28, as seen in FIG. 2, wherein a vertical cavity 30 is formed in the ground 32 below firebox well 18. This arrangement allows a hydraulic motor device, generally indicated at 34, to be located in central alignment with the firebox well 18. The hydraulic motor device comprises a cylindrical housing 36 having a lower, sealed, closed end cap 38 which rests at the bottom of cavity 30. The upper end of housing 36 includes a piston cap member 40 which is fixedly sealed thereto having an "O"-ring sealing means 42 annularly disposed thereon. Piston cap 40 includes an air hole 44 bored therethrough in a well understood manner to relieve internal pressure between cap 40 and piston head 45, whereby the piston head moves upwardly and downwardly by applied pressure or release of applied pressure to head 45, respectively. A detailed description thereof will hereinafter be described.

Included within piston head 45 is an annular sealing means 46, indicated as an "O" ring, wherein a central bore 48 is disposed to receive the elongated piston rod 50 which extends upwardly through bore 52 of cap 40, the length of the piston rod 50 being long enough when activated to reach the adjacent well opening 20.

Affixed to the extended free end of piston rod 50 is a support plate 53 having an area suitable to support a firebox unit, indicated at 55, wherein the firebox has a configuration similar to well 18.

In both FIGS. 1 and 2, the firebox 55 is shown in a lowered position; and in FIG. 2 it is shown in phantom lines, as it would be positioned at its uppermost location directly adjacent the underside of grill 22. Thus, it can be seen that the adjusting position of box 55 can be arranged at any point therebetween depending on what is being cooked at any given time, and the amount of coals or fuel material disposed in box 55.

To operate the hydraulic cylinder, there is provided at the lower end thereof an inlet nipple 56 to which an available water system is attached thereto. The water system itself is not shown and is well understood, as it would be the same system that feeds the house, or typical yard area of a house. Thus, a water pipe 60 is connected to a conventional water system, wherein pipe 60 connects to the inlet side 62 of a flow-control-valve means 64. Valve means 64 includes an outlet side 66 and a discharge outlet 68, wherein valves 62 and 68 each include valve members 70 and 72, respectively. Hence, a discharge pipe line 74 is connected to discharge side 68, and a third pipe 76 is connected between outlet 66 and inlet nipple 56 of the cylinder housing 36.

Accordingly, when firebox 55 is to be moved upwardly, lever 78 of valve 64 is operated to engage valve member 70 to allow pressurized water to flow from pipe 60 into pipe 76 which feeds water to the pressure side of piston head 45, forcing piston head and rod 50 to move upwardly with box 55. Lever 78 is released when box 55 is adjusted to the desired height in well 18.

However, when the box is to be lowered, lever 78 is engaged with valve member 72, thus allowing the weight of the box 55 to force the water out of housing 36 into discharge pipe 74. Hence, very accurate adjustments can be made to control the fire and heat coming from firebox 55 during cooking.

Further included is a stabilizing guide means operably connected between the cylinder housing 36 and plate 53, whereby box 55 and its contents can be raised and lowered in a balanced and stabilized manner. The stabilizing guide means comprises a stabilizing rod 80 affixed to plate 52 and depends downwardly therefrom in order to be received in tube member 82, which itself is secured to housing 36 (see FIG. 2).

The invention and its attendant advantages will be understood from the foregoing description; and it will be apparent that various changes may be made in the form, construction and arrangement of the parts of the invention without departing from the spirit and scope thereof or sacrificing its material advantages, the arrangement herein before described being merely by way of example; and we do not wish to be restricted to the specific form shown or uses mentioned, except as defined in the accompanying claims.

We claim:

1. A hydraulic-lift barbecue cooking apparatus supported on a ground surface and operated by a conventional water-pressure system comprising:
    a superstructure defining a housing;
    a fire well disposed in said superstructure housing having an upper, open end and a closed bottom, said bottom being closed by said ground surface;
    a firebox arranged to be movably received in said fire well;
    a cavity formed in said ground surface directly under said fire well;
    a hydraulic-lift means located in said cavity to movably support said firebox within said fire well, whereby said firebox can be moved the full length of said fire well, wherein said lift means comprises:
    a cylindrical housing having a sealed, closed end cap and a piston-cap member;
    a piston head slidable within said housing;
    a piston rod attached to said piston head and having a free end extending outwardly from said piston-cap member;
    a support plate secured to said free end of said piston rod to support said firebox thereon;
    a valve means interconnected between said water-pressure system and said hydraulic-lift means, whereby water pressure is regulated and supplied to said hydraulic-lift means to control the movement thereof, said valve means having an inlet side, an outlet side and a discharge side;
    a plurality of pipes interconnecting said water system to said hydraulic-lift means, said pipes comprising a water-supply pipe connected to said inlet side, a pipe section interconnected between said outlet side and said hydraulic-lift means, and a discharge-pipe line connected to said discharge outlet of said valve means, whereby said water from said hydraulic-lift means is discharged remotely from said hydraulic-lift means; and
    a stabilizing guide means attached to said hydraulic lift to stabilize and guide the up-and-down movement of said firebox,
    wherein said stabilizing guide means comprises:
    a stabilizing rod affixed to said support plate; and
    a tube member mounted to the side of said cylindrical housing and adapted to receive said stabilizing rod, whereby said rod moves with said support plate and said piston rod.

* * * * *